United States Patent
Ryu et al.

(10) Patent No.: US 12,192,938 B2
(45) Date of Patent: Jan. 7, 2025

(54) NON-TERRESTRIAL NETWORKS

(71) Applicant: Samsung Electronics Co., Ltd., Suwon-si (KR)

(72) Inventors: Hyunseok Ryu, Suwon-si (KR); Shangbin Wu, Staines (GB); Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 17/441,011

(22) PCT Filed: Mar. 19, 2020

(86) PCT No.: PCT/KR2020/003791
§ 371 (c)(1),
(2) Date: Sep. 20, 2021

(87) PCT Pub. No.: WO2020/204421
PCT Pub. Date: Oct. 8, 2020

(65) Prior Publication Data
US 2022/0174635 A1 Jun. 2, 2022

(30) Foreign Application Priority Data
Mar. 29, 2019 (GB) ..................... 1904465

(51) Int. Cl.
*H04W 56/00* (2009.01)
*H04B 7/06* (2006.01)
(Continued)

(52) U.S. Cl.
CPC ...... *H04W 56/0045* (2013.01); *H04B 7/0626* (2013.01); *H04L 1/0003* (2013.01); *H04W 84/06* (2013.01)

(58) Field of Classification Search
None
See application file for complete search history.

(56) References Cited

U.S. PATENT DOCUMENTS 10,547,374 B1 * 1/2020 Liu ............... H04W 52/42
11,082,941 B2 * 8/2021 Abedini ............ H04W 56/0005
(Continued)

FOREIGN PATENT DOCUMENTS

CN 110446254 A * 11/2019 .......... H04W 56/001
WO 2016/184015 A1 11/2016
(Continued)

OTHER PUBLICATIONS

3rd Generation Partnership Project; Technical Specification Group Radio Access Network; Study on New Radio (NR) to support non terrestrial networks (Release 15), 3GPP TR 38.811 V15.0.0, Aug. 10, 2018.
(Continued)

*Primary Examiner* — Kodzovi Acolatse
(74) *Attorney, Agent, or Firm* — Jefferson IP Law, LLP (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of operating a non-terrestrial network comprising the step of: configuring a Timing Advance, TA, value comprising a cell-specific common TA and a residual TA, wherein the cell-specific common TA is broadcast by a satellite in connection with a particular cell.

8 Claims, 2 Drawing Sheets

(51) Int. Cl.
  *H04L 1/00* (2006.01)
  *H04W 84/06* (2009.01)

(56) References Cited

U.S. PATENT DOCUMENTS

| | | | |
|---|---|---|---|
| 11,424,819 B2* | 8/2022 | Luo | H04B 7/2041 |
| 2007/0123252 A1* | 5/2007 | Tronc | H04B 7/18591 |
| | | | 455/427 |
| 2012/0155130 A1 | 6/2012 | Hosini et al. | |
| 2012/0155310 A1* | 6/2012 | Kreuzer | H04W 52/245 |
| | | | 370/252 |
| 2014/0204919 A1 | 7/2014 | Chen et al. | |
| 2016/0226574 A1 | 8/2016 | Lamarca et al. | |
| 2018/0324882 A1* | 11/2018 | Gulati | H04W 72/23 |
| 2019/0349871 A1* | 11/2019 | Ghosh | H04B 7/155 |
| 2019/0386926 A1* | 12/2019 | Abedini | H04W 56/0055 |
| 2020/0196263 A1* | 6/2020 | Heyn | H04W 56/0005 |
| 2020/0213989 A1 | 7/2020 | Choi et al. | |
| 2021/0175964 A1 | 6/2021 | Kusashima et al. | |
| 2021/0321464 A1* | 10/2021 | Lin | H04W 76/11 |
| 2021/0345281 A1* | 11/2021 | Yang | H04W 56/0045 |
| 2021/0392597 A1* | 12/2021 | Xu | H04W 56/00 |
| 2021/0399797 A1* | 12/2021 | Khan | H04B 7/18541 |
| 2022/0150858 A1* | 5/2022 | Ren | H04W 56/0045 |
| 2022/0191946 A1* | 6/2022 | Nishio | H04L 5/0051 |

FOREIGN PATENT DOCUMENTS

| | | | | |
|---|---|---|---|---|
| WO | 2019/050371 A1 | 3/2019 | | |
| WO | 2019/097922 A1 | 5/2019 | | |
| WO | WO-2020164362 A1 * | 8/2020 | | G01S 19/42 |
| WO | WO-2020169048 A1 * | 8/2020 | | H04W 56/0035 |

OTHER PUBLICATIONS

Korean Office Action dated Jul. 31, 2023, issued in Korean Application No. 10-2021-7031011.
Zte, "Discussion on the enhancement for TA in NTN," 3GPP TSG RAN WG1 #96 R1-1901841, Athens, Greece, Feb. 15, 2019.
Zte et al., "TP for TR38.811 on random access for NTN," 3GPP TSG RAN WG1 Meeting #93, R1-1806156, Busan, Korea, May 11, 2018.
Nokia et al., "Overview for NR supporting NTN," 3GPP TSG RAN WG1 Meeting #96 R1-1901722, Athens, Greece, Feb. 16, 2019.
Nokia et al., "Positioning in NTN," 3GPP TSG-RAN WG1 #96 R1-1901721, Athens, Greece, Feb. 16, 2019.
ZTE Corporation et al., "Consideration on Random Access for NTN," 3GPP TSG RAN WG2 Meeting #105bis R2-1903391, Revision of R2-1900576, Xi'an, China, Mar. 28, 2019.
International Search Report Aug. 28, 2019, issued in Great Britain Application No. 1904465.0.
Apple: "Key change in DC based HO", 3GPP Draft; R2-1901841_ Key Change in DC based HO_v1, 3rd Generation Partnership Project (3GPP), Mobile Competence Centre ; 650, route des Lucioles ; F-06921 Sophia-Antipolis Cedex ; France, vol. RAN WG2, No. Athens, Greece; Feb. 25, 2019-Mar. 1, 2019, R2-19018, Feb. 15, 2019 (Feb. 15, 2019), XP051603190, Mobile Competence Centre ; 650, route des Lucioles ; F-06921 SophiaAntipolis Cedex ; France.
Extended European Search Report dated Mar. 14, 2022, issued in European Application No. 20783070.4.
European Office Action dated Jan. 23, 2024, issued at the European Application No. 20 783 070.4-1206.
Korean Office Action dated Feb. 23, 2024, issued at the Korean Application No. 10-2021-7031011.
Decision of Rejection dated Jun. 26, 2024, issued in Korean Application No. 10-2021-7031011.

* cited by examiner

NON-TERRESTRIAL NETWORKS

TECHNICAL FIELD

The present invention relates to a non-terrestrial networks (NTN). It particularly applies to New Radio (NR) or Fifth Generation (5G) systems but has wider application.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

The current NR specification is mainly designed for cellular system and is not specifically arranged to handle such propagation delay and Doppler Effect and therefore enhanced mechanisms are needed. Embodiments of this invention aim to provide methods and apparatus to address such issues, whether mentioned herein or not.

Solution to Problem

According to the present invention there is provided an apparatus and method as set forth in the appended claims. Other features of the invention will be apparent from the dependent claims, and the description which follows.

According to a first aspect of the present invention, there is provided a method of operating a non-terrestrial network comprising the step of: configuring a Timing Advance, TA, value comprising a cell-specific common TA and a residual TA, wherein the cell-specific common TA is broadcast by a satellite in connection with a particular cell.

According to a second aspect of the present invention, there is provided method of operating a non-terrestrial network comprising the step of: using adaptive modulation and coding, AMC, to take account of channel conditions;

According to a third aspect of the present invention, there is provided method of operating a non-terrestrial network comprising the step of: implementing either open-loop or closed-loop power control in the uplink According to a fourth aspect of the present invention, there is provided method of operating a non-terrestrial network comprising the step of: splitting available resources between a feeder link and a user link to achieve optimal spectral efficiency.

According to a fifth aspect of the present invention, there is provided method of operating a non-terrestrial network comprising a combination of any of the preceding aspects.

According to a sixth aspect of the present invention, there is provided apparatus arranged to perform the method of any preceding aspect.

Although a few preferred embodiments of the present invention have been shown and described, it will be appreciated by those skilled in the art that various changes and modifications might be made without departing from the scope of the invention, as defined in the appended claims.

Advantageous Effects of Invention

Embodiments of this invention provide methods and apparatus to address propagation delay and Doppler Effect in Non-Terrestrial Networks.

MODE FOR THE INVENTION

New radio (NR) targets a wide range of use cases in 5G. The application of a high-altitude platform station (HAPS) and satellite nodes in NR can be important components of 5G. The deployment of non-terrestrial networks (NTNs) raises different issues to deployment of terrestrial.

In NTN networks, due to the extremely large distance between the base station (gNB) and the user equipment (UE), the propagation delay can be up to a few hundreds ms for GEO satellites, especially for a so-called "bent pipe" scenario, sending to/from Earth what goes into the conduit with only amplification and a shift from uplink to downlink or vice-versa.

Another main issue for NTN is the Doppler Effect due to the fast relative movement between a spaceborne vehicle, e.g., LEO satellite, and the UE, which can be more than 7 km per second and more than 20 ppm Doppler shift for a 2 GHz carrier frequency. The long propagation delay and Doppler Effect have impacts on physical layer control procedures such as link adaptation, i.e., AMC, CSI feedback and power control because the channel feedback can easily become out of date.

The current NR specification is mainly designed for cellular system and is not specifically arranged to handle such propagation delay and Doppler Effect and therefore enhanced mechanisms are needed. Embodiments of this invention aim to provide methods and apparatus to address such issues, whether mentioned herein or not.

According to the present invention there is provided an apparatus and method as set forth in the appended claims. Other features of the invention will be apparent from the dependent claims, and the description which follows.

According to a first aspect of the present invention, there is provided a method of operating a non-terrestrial network comprising the step of: configuring a Timing Advance, TA, value comprising a cell-specific common TA and a residual TA, wherein the cell-specific common TA is broadcast by a satellite in connection with a particular cell.

In an embodiment, the cell-specific common TA is determined on the basis of satellite ephemeris.

In an embodiment, the cell-specific common TA is arranged to updated via broadcasting or locally, if the satellite ephemeris is known to the UE.

In an embodiment, the TA value comprises a plurality of separate TA values, wherein each of the plurality of separate TA values is associated with a defined region of a cell.

In an embodiment, a UE in the cell is either informed of which of the plurality of TA values to use via a signal from the satellite, or the UE derives which of the plurality of TA values to use on the basis of its location within the cell.

According to a second aspect of the present invention, there is provided method of operating a non-terrestrial network comprising the step of: using adaptive modulation and coding, AMC, to take account of channel conditions;

In an embodiment, a base station in the network applies an offset between the modulation and coding rate based on a reported channel quality measurement.

In an embodiment, a lower modulation order and/or coding rate is applied is applied than would otherwise be indicated.

In an embodiment, a plurality of Modulation Coding Scheme, MCS, tables are defined and wherein different UEs in the network are configured according to respective ones of the different MCS tables.

In an embodiment, AMC is disabled and a fixed modulation and coding rate is employed by a UE operating in the network.

In an embodiment, a channel measurement is performed on the basis of long-term channel conditions, such that short term variations can be accounted for.

In an embodiment, modulation and/or coding rate are determined on the basis of one or more of previous channel measurement information, UE trajectory and gNB trajectory.

In an embodiment, the channel reporting is disabled in defined conditions.

According to a third aspect of the present invention, there is provided method of operating a non-terrestrial network comprising the step of: implementing either open-loop or closed-loop power control in the uplink In an embodiment, uplink power control performed by the UE is defined as:

PTX=min {Pcmax, P0+α·PL+Δ}

Pcmax: the maximum UE's transmission power which is related to the UE power class (i.e., 23 dBm, 26 dBm and 31 dBm).

P0: This parameter is configured by the gNB. It is relevant to a target received power at the receiver side (i.e., gNB in UL).

α: This parameter is configured by the gNB. It is used for compensating the path loss and the range of this value is [0, 1]. For example, if α=1, it means that the pathloss is fully compensated. If α=0.8, then the pathloss is partially compensated.

PL: downlink path loss which is measured by UE

Δ: a closed-loop power control parameter indicated by DCI.

In an embodiment, open loop power control comprises the step of configuring a UE with a maximum transmission mode wherein the UE transmits with full power as long as this is within the maximum power range of a UE.

In an embodiment, open loop power control is based upon available information regarding movement or trajectory of devices in the network, such as satellite ephemeris, UE trajectory, if a certain predefined condition, configured by a base station in the network, are met.

In an embodiment, power control can be based on location information of both a satellite in the network and a UE in the network.

In an embodiment, both of open and closed power control can be applied on a UE group basis In an embodiment, said grouping is based on one or more variables such as UE location or UE power category.

In an embodiment, closed loop power control can be activated or deactivated based on a predefined condition, such as distance.

According to a fourth aspect of the present invention, there is provided method of operating a non-terrestrial network comprising the step of: splitting available resources between a feeder link and a user link to achieve optimal spectral efficiency.

In an embodiment, channel state information on the feeder and user links is used to determine the splitting.

According to a fifth aspect of the present invention, there is provided method of operating a non-terrestrial network comprising a combination of any of the preceding aspects.

According to a sixth aspect of the present invention, there is provided apparatus arranged to perform the method of any preceding aspect.

Although a few preferred embodiments of the present invention have been shown and described, it will be appreciated by those skilled in the art that various changes and modifications might be made without departing from the scope of the invention, as defined in the appended claims.

Figure 1:
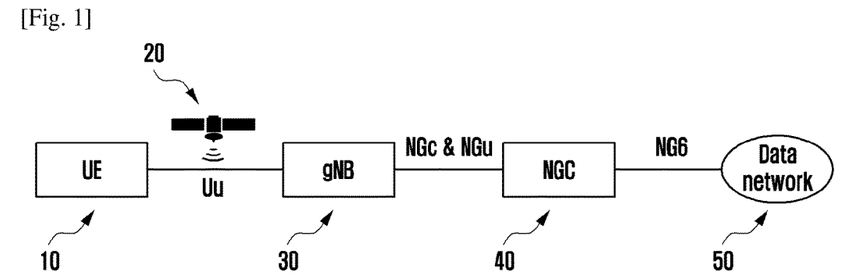
FIG. 1 shows a non-terrestrial network architecture according to an embodiment of the present invention.

For a better understanding of the invention, and to show how embodiments of the same may be carried into effect, reference will now be made, by way of example only, to the accompanying diagrammatic drawings in which:

FIG. 1 shows a system-level representation of an NTN. It shows a UE 10 which communicates via satellite 20 with a gNB 30. The gNB then communicates with core network NGC 40, which, in turn, communicates with a data network 50. Note that data flow is bidirectional.

Considering the extremely long propagation delay, the Timing Advance (TA) value can be much larger than that of terrestrial cellular networks. Configuring TA values based on absolute propagation delay is not feasible. A cell-specific common TA value can be broadcast by the satellite so that the UE only needs to handle the residual TA. However, even the residual TA can be significant, especially for GEO satellite where the cell size can be up to a thousand km.

One solution is to extend the current TA value range for NTN i.e. define a new range of values in such cases. Considering the current cell size in NR, the TA value range should be extended by at least K times, where K can be from 2 to 16. The common TA values may be based on satellite ephemeris and can either be updated periodically via broadcasting or updated locally by the UE if satellite ephemeris is known to the UE.

Figure 2:
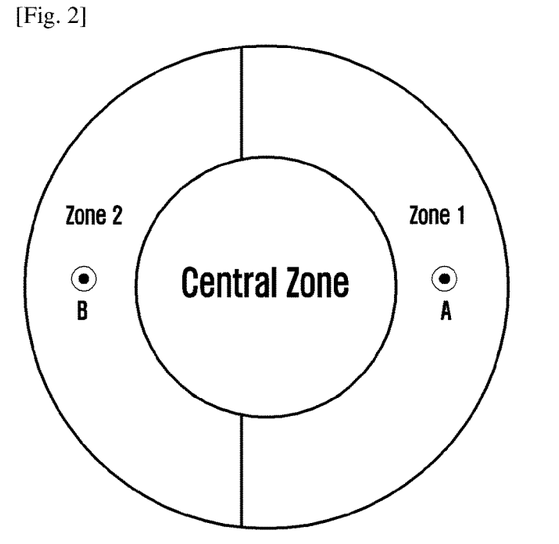
FIG. 2 shows a representation of Timing Advance (TA) zones according to an embodiment of the present invention.

Another alternative is to assume a set of TA values consisting of multiple TA values. For example, one cell can be divided into two zones as shown in FIG. 2. For the central zone, the reference point for TA value is the central point of the cell. For the surrounding zone 1 and 2, the reference point can be chosen as point A and B, respectively. In total, therefore, three TA values can be assumed and which TA value is assumed by the UE can either be signaled by the satellite via RRC, MAC CE or DCI or may be derived by the UE itself if it knows its own location via, e.g., GNSS.

For bent-pipe architecture, if the satellite only amplifies and forwards the received signal without any local processing, the TA value is determined by the overall propagation delay including both feeder link and user link. However, if local processing is involved at the satellite relay, two TA values should be configured. One is for the user link and another for feeder link, to take account of this local processing.

Adaptive modulation and coding (AMC) is employed in communication systems to adopt the variation of the channel condition from time to time. In downlink (DL), the UE can measure the channel, calculate Channel Quality Indicator (CQI) based on channel measurement and then feedback the CQI values to the gNB. Then, the gNB chooses an appropriate modulation and coding scheme according to the CQI values. By doing this, a near optimal modulation coding scheme can be used to achieve the maximum spectral efficiency while, at the same time, meeting the target Block Error Ratio (BLER) requirement. However, in NTN, when the gNB receives the reported CQI values, the channel condition may have already changed and if the modulation and coding scheme is chosen based on the reported CQI values, it could either lead to higher BLER or lower spectral efficiency.

Different embodiments of the present invention address this problem.

From a reliability perspective, the gNB can choose to operate in a conservative manner. In a first embodiment, this means that the gNB can always choose to apply an offset between the modulation and coding rate based on the reported CQI values and the actual modulation and coding rate applied. In other words, a lower modulation order and coding rate than that based on the reported CQI values can be applied by the gNB to guarantee the reliability at the cost of spectral efficiency. This offset value should be configured by RRC signaling in a UE specific manner, considering UEs in different scenarios, and/or with different reliability requirements. Otherwise, this offset value can be pre-defined or broadcast to the UE and a signal sent via, e.g., RRC, MAC CE or DCI, can be used to trigger the usage of this offset. An option in the first embodiment is to introduce different Modulation Coding Scheme (MCS) tables. For example, there are two MCS tables; MCS table A and MCS table B. If the UE is configured with Table A by UE-specific RRC signaling, the UE expects that the same MCS as that based on the reported CQI values from the UE is selected by gNB. If the UE is configured with Table B by UE-specific RRC signaling, the UE expects that a lower MCS than that based on the reported CQI from the UE is selected by gNB.

In a second embodiment, a long term channel condition is utilised, which is expected to be more stable than a short term channel condition, to determine modulation and coding rate. In this case, the CQI report can also be based on long term channel measurement and the reporting periodicity can be longer. For example, a configuration about CQI report by gNB implies channel measurement=A1 and the reporting periodicity=B1. Another configuration about CQI report by the gNB implies channel measurement=A2 and reporting periodicity B2. In this example, A1>A2 and B1>B2. This configuration is performed by UE-specific RRC signaling.

In a third embodiment, in order to improve spectral efficiency, a prediction based approach can also be used where the gNB predicts modulation and coding rate based on a previous channel condition report, gNB and UE trajectory, etc. A confidence level can also be indicated with the prediction so that the UE can choose its own behaviour based on the confidence level. From the gNB perspective, such a confidence level indicates the accuracy level of the prediction at the gNB.

The confidence level can be interpreted from the UE perspective. From the UE perspective, in this example, there are different confidence levels depending on the accuracy level of the gNB prediction. So, each confidence level can be associated with the level of the accuracy for prediction. For example, confidence level A means an accuracy level A and confidence level B means an accuracy level B. Either the confidence level or the accuracy level can be configured by using UE-specific RRC signaling, UE-common RRC signaling, or system information (i.e., SIB). So, if the UE receives one of them, the UE can choose its own behaviour depending on the configured confidence level or the accuracy level. It is also possible that an offset to compensate for the error between ideal prediction and actual prediction is configured together with the confidence level or the accuracy of the prediction. For the calculation of the ideal prediction, all the random impairments such as fast fading and shadowing can be ignored assuming ideal channel environment.

In a fourth embodiment, there is introduced a CQI report disabling mechanism based on certain conditions such as satellite and/or UE location and speed, channel condition, etc. For example, if the distance between the UE and the satellite is very large and/or the propagation delay is larger than a certain defined threshold, CQI reporting is disabled. In such a case, the threshold can be configured by RRC or system information (i.e., SIB). The UE compares the configured threshold with its measurement results on distance and/or propagation delay. If the measured distance and/or propagation by the UE is higher than the threshold (or higher than or equal to the threshold), the UE does not report CQI to the gNB. Otherwise, CQI reporting continues. On the other hand, the gNB can enable or disable the UE's CQI reporting by using explicit signaling such as RRC, MAC CE or DCI.

It should be noted that the same issue will also happen in Uplink (UL) and similar approaches can be employed. For the bent-pipe architecture, if the satellite only amplifies and forwards the received signal without any local processing, AMC is determined by the overall channel quality including both feeder link (Link 1) and user link (Link 2). However, if certain local processing is involved at the satellite relay, individual AMC is configured. One is for Link 1 and the other for Link 2. This can be achieved in an implicit manner. In the implicit manner, if the UE is configured with a single MCS table, then the UE assumes that AMC is determined by the overall channel quality including Link 1 and Link 2. If the UE is configured with two MCS tables, then the UE assumes that individual AMC is used. MCS table 1 is used for selecting MCS of Link 1 and MCS table 2 is used for selecting MCS of Link 2.

In order to apply different physical layer procedures to bent-pipe and non bent-pipe architectures, there may be a need for the gNB to explicitly or implicitly indicate if the current architecture is bent-pipe. The explicit signaling can be SIB, RRC or even high layer signaling where 1-bit indication to distinguish between bent-pipe and non bent-pipe architectures can be used but other ways to achieve this are not precluded. The implicit indication can be achieved by using different types of SIBs. For example, if SIB-X is configured, then bent-pipe architecture is assumed by the UE. If SIB-Y is configured, then the UE assumes a non bent-pipe architecture.

In NR, the UE is required to measure the channel and feedback the CSI information so that the serving gNB can determine its transmission behaviour including pre-coding, MCS, RS configurations, etc. In the meantime, the UE also needs to conduct RRM measurement via SSB/CSI-RS and report the measurements back to the serving gNB to facilitate procedures such as mobility management. As aforementioned, the measurement reports may be out of date due to the extremely long propagation delay. In this regard, the use of only long-term channel measurement is more feasible. Therefore, a solution is to activate or deactivate short term CSI and RRM measurement. This activation/deactivation can be done by using one of the following signaling; UE-specific RRC, UE-common RRC, SIB, MAC CE, or DCI.

Furthermore, prediction can be applied for CSI and RRM measurement, based on the knowledge of UE trajectory and/or satellite ephemeris. For a bent-pipe architecture, if the satellite only amplifies and forwards the received signal without any local processing, CSI is measured for the overall channel including both feeder link (Link 1) and user link (Link 2). However, if certain local processing is involved at the satellite relay, individual CSI measurement may need to be configured. One is for the user link and another for feeder link.

Power control can be categorized into open loop or closed loop depending on whether feedback is needed. More specifically, UL power control performed by UE can be formulated as follows:

PTX=min {Pcmax, P0+α·PL+Δ}

Pcmax: the maximum UE's transmission power which is related to the UE power class (i.e., 23 dBm, 26 dBm and 31 dBm).

P0: This parameter is configured by the gNB. It is relevant to a target received power at the receiver side (i.e., gNB in UL).

α: This parameter is configured by the gNB. It is used for compensating the path loss and the range of this value is [0, 1]. For example, if α=1, it means that the pathloss is fully compensated. If α=0.8, then the pathloss is partially compensated.

PL: downlink path loss which is measured by UE.

Δ: a closed-loop power control parameter indicated by DCI.

In the above equation, open-loop power control includes P0, α and PL. On the other hand, closed-loop power control includes Δ, which means that the UE reports some information to the gNB such as power headroom report and/or Pcmax. Based on the report by the UE, the gNB decides whether the UE has to increase or decrease transmission power, which is indicated by DCI.

For NTN, open loop power control without feedback appears to be more suitable considering the longer propagation delay than in a normal cellular system (i.e. a terrestrial system). However, there are cases where propagation delay is not so large (e.g., the satellite altitude is lower than a defined threshold and/or the satellite speed is lower than a threshold) or the gNB wants to collect UE assist information such as RSRP measured by UE, UE location information, Pcmax etc. In such cases, it is desirable for the gNB to have the flexibility to enable/disable closed-loop power control. In order to achieve this, explicit or implicit signaling is supported. For the explicit signaling, gNB can configure whether closed-loop power control is enabled or disabled by using SIB, RRC or DCI. For an example of the implicit signaling, if one or more than one DCI field is set to particular value, e.g., all zeros or all ones, then the UE assumes that closed-loop power control is not used.

In order to combat the large path loss due to long distance, a UE may be configured with a maximum transmission mode in which the UE transmits with full power as long as it is within the maximum power range of a UE. So, it would be possible for the gNB to control whether UE transmission power has to be set to a maximum transmission power that the UE can support or the UE transmission power has to set by using the open-loop power control formula. This control can be done by SIB, RRC, or DCI.

As mentioned earlier, open-loop power control includes a DL pathloss measurement performed by the UE. Since in NTN, this measurement can often be out-of-date considering the longer propagation delay, the DL pathloss measurement may not be suitable for NTN.

However, there are case where propagation delay is not so large, as mentioned before. In such case, open-loop power control based on the DL pathloss measurement is still useful. So, it is desirable for the gNB to have the flexibility of determining the UE's behavior. For example, if a certain condition is met (e.g., propagation delay is less than a configured threshold), the UE autonomously follows the DL pathloss measurement for open-loop power control. Otherwise, the UE can use other available information such as gNB ephemeris and UE trajectory as well as DL reference signal (e.g., SSB/CSI-RS) for DL pathloss measurement. The reverse is also possible, i.e., if a condition is met, the UE autonomously uses additional information. Otherwise, the UE only uses the DL reference signal for pathloss estimation. The threshold mentioned above can be configured by the gNB.

Moreover, the distance between the different UEs and the serving gNB does not actually differ much considering the long distance, e.g., 35786 km for GEO satellite. In this regard, the transmission power of different UEs have a common part and this common part can be configured for all the UEs in the cell via broadcasting (i.e., SIB). Similar to TA, as mentioned before, multiple common power values can be assumed for different zones within one cell (as shown in FIG. 2) and these can be configured in a grouped manner.

Location based power control can also be considered for NTN if, for example, the UE and satellite location are available to the UE. The UE can then, based on such information and path loss model information, calculate the transmission power. The path loss model can be pre-defined or it can be gradually adjusted by gNB signaling. In addition, different power control parameters can be employed based location of the satellite and the UE if such information is available. For example, as shown in FIG. 2, three different power control parameters (Pcmax0, Pcmax1, Pcmax2, P00, P01, P02, and $\alpha 0$, $\alpha 1$, $\alpha 2$) can be employed in three different zones. For central zone, Pcmax0, P00, and $\alpha 0$ can be used and for zone 1 and zone 2, Pcmax1, P01, $\alpha 1$ and Pcmax2, P02 and $\alpha 2$ can be used, respectively. Also, it is possible to use different power control mechanisms depending on the location. For example, for central zone, the DL reference signal based path loss measurement and closed-loop power control can be used. For zone 1 and zone 2, these mechanisms can be disabled or deactivated.

As mentioned earlier, there are cases where propagation delay is not so large (e.g., the satellite altitude is lower than a threshold and/or the satellite speed is lower than a threshold). In such cases, using closed-loop power control is still beneficial. The transmission power of different UEs can be UE-specifically adjusted by using UE-specific DCI scrambled with C-RNTI or adjusted on a group-basis by using group common DCI scrambled with a group-common RNTI which is different from C-RNTI. It is thus possible for the gNB to control such that UEs use a maximum transmission power by UE-specific DCI or group-common DCI.

For a bent-pipe architecture, the closed loop configuration signaling is from the gNB on the ground but both the power of the relay satellite and the UE may be controlled. If satellite and gNB do power control separately for the link between the UE and satellite, and the link between the satellite and the gNB on the ground, further enhancements are not required. If the gNB does power control for the overall channel, the existing closed loop power control can also be reused assuming the transmission power of the satellite relay remains unchanged. If only the gNB does power control, it can be performed in the following ways. The satellite relays the power control information to the UE and the UE adjusts its power based on the signaling. If the UE can achieve the target power, there is no need to have a further procedure. If not, due to maximum transmission power limit, the UE informs the satellite relay so that the satellite relay can enhance its own transmission power.

Without a full duplex assumption, the relay satellite is assumed to work in a half-duplex manner, e.g., TDMed or FDMed feeder link and user link. The resource splitting between feeder and user links should be optimized to achieve the maximum spectral efficiency.

Normally, the feeder link has a much higher quality than the user link. Fewer resources, e.g., time in TDM manner, should be allocated to the feeder link. If channel state information is available for both feeder and user links, the gNB on the ground can use such information to optimize the splitting and such configuration info should be passed to the UE so that the UE knowns the duration of transmission/reception. If such channel state information is not available, the gNB on the ground can still assume some pre-defined splitting and, based on performance or measurement, such splitting can be gradually optimized.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Figure 3:
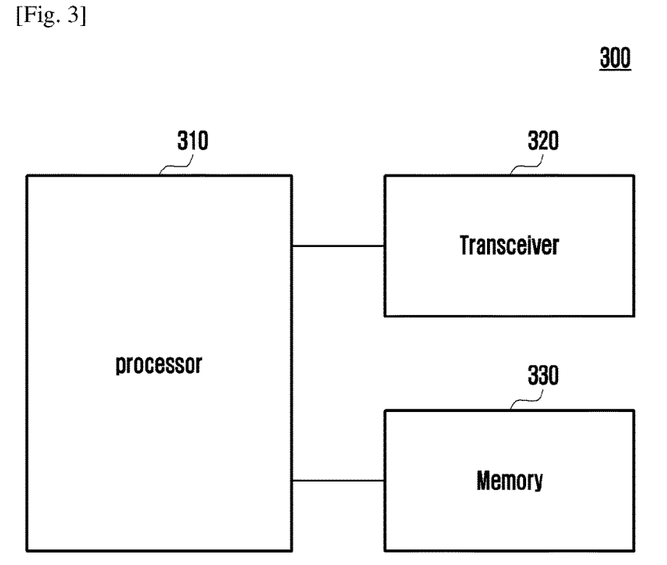
FIG. 3 shows a block diagram of a base station (BS) according to embodiments of the present disclosure.

FIG. 3 illustrates a block diagram of a base station (BS) according to embodiments of the present disclosure.

Referring to the FIG. 3, the BS 300 may include a processor 310, a transceiver 320 and a memory 330. However, all of the illustrated components are not essential. The BS 300 may be implemented by more or less components than those illustrated in FIG. 3. In addition, the processor 310 and the transceiver 320 and the memory 330 may be implemented as a single chip according to another embodiment.

The aforementioned components will now be described in detail.

The processor 310 may include one or more processors or other processing devices or a controller that control the proposed function, process, and/or method. Operation of the BS 300 may be implemented by the processor 310.

The transceiver 320 may include a RF transmitter for up-converting and amplifying a transmitted signal, and a RF receiver for down-converting a frequency of a received signal. However, according to another embodiment, the transceiver 320 may be implemented by more or less components than those illustrated in components.

The transceiver 300 may be connected to the processor 310 and transmit and/or receive a signal. The signal may include control information and data. In addition, the transceiver 320 may receive the signal through a wireless channel and output the signal to the processor 310. The transceiver 320 may transmit a signal output from the processor 310 through the wireless channel.

The memory 330 may store the control information or the data included in a signal obtained by the BS 300. The memory 330 may be connected to the processor 310 and store at least one instruction or a protocol or a parameter for the proposed function, process, and/or method. The memory 330 may include read-only memory (ROM) and/or random access memory (RAM) and/or hard disk and/or CD-ROM and/or DVD and/or other storage devices.

Figure 4:
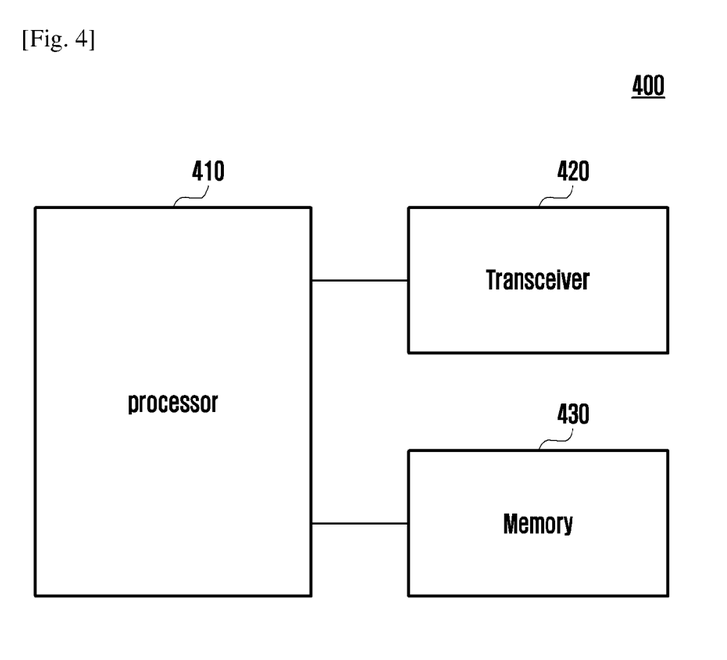
FIG. 4 shows a user equipment (UE) according to embodiments of the present disclosure.

FIG. 4 illustrates a user equipment (UE) according to embodiments of the present disclosure.

Referring to the FIG. 4, the UE 400 may include a processor 410, a transceiver 420 and a memory 430. However, all of the illustrated components are not essential. The UE 400 may be implemented by more or less components than those illustrated in FIG. 4. In addition, the processor 410 and the transceiver 420 and the memory 430 may be implemented as a single chip according to another embodiment.

The aforementioned components will now be described in detail.

The processor 410 may include one or more processors or other processing devices or a controller that control the proposed function, process, and/or method. Operation of the UE 400 may be implemented by the processor 410.

In one embodiment, the processor 410 may measure the signal strength from one or more base stations and transmit PRS with a power determined based on the measurements.

In one embodiment, the processor 410 may receive signaling from a base station and transmit PRS with a power determined based on the signaling.

The transceiver 420 may include a RF transmitter for up-converting and amplifying a transmitted signal, and a RF receiver for down-converting a frequency of a received signal. However, according to another embodiment, the transceiver 420 may be implemented by more or less components than those illustrated in components.

The transceiver 420 may be connected to the processor 410 and transmit and/or receive a signal. The signal may include control information and data. In addition, the transceiver 420 may receive the signal through a wireless channel and output the signal to the processor 410. The transceiver 420 may transmit a signal output from the processor 410 through the wireless channel.

The memory 430 may store the control information or the data included in a signal obtained by the UE 400. The memory 430 may be connected to the processor 410 and store at least one instruction or a protocol or a parameter for the proposed function, process, and/or method. The memory 430 may include read-only memory (ROM) and/or random access memory (RAM) and/or hard disk and/or CD-ROM and/or DVD and/or other storage devices.

Certain examples of the present disclosure may be provided in the form of a base station (e.g. gNB) and/or method therefore. Certain examples of the present disclosure may be provided in the form of a mobile device (e.g. UE) and/or method therefore. Certain examples of the present disclosure may be provided in the form of a system comprising one or more base stations and one or more mobile devices, and/or method therefore.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method step disclosed herein may be performed by a single entity (hardware and/or software), or the performance of such a process, operation and/or method step may be distributed and performed by two or more entities in cooperation. The skilled person will also appreciate that a single entity (hardware and/or software) may be configured to perform one process, operation and/or method step disclosed herein, or may be configured to perform two or more such processes, operations and/or method steps.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

The invention claimed is:

1. A method performed by a user equipment (UE) in a non-terrestrial network (NTN), the method comprising:
   receiving, from a base station via a satellite, first information associated with a first timing advance (TA) common for a cell;
   determining a second TA based on a position of the UE;
   performing, based on the first TA and the second TA, uplink transmission to the base station;
   receiving, from the base station via the satellite, second information on a threshold for a channel quality indicator (CQI) report disabling mechanism; and
   determining whether the CQI report is disabled or not based on a comparison between the threshold and a measured propagation delay between the UE and the satellite.

2. The method of claim 1, wherein the CQI report is disabled, in case that the measured propagation delay between the UE and the satellite is larger than the threshold.

3. A method performed by a base station in a non-terrestrial network (NTN), the method comprising:
   transmitting, to a user equipment (UE) via a satellite, first information associated with a first timing advance (TA) common for a cell;
   performing, based on the first TA and a second TA, uplink reception from the UE; and
   transmitting, to the UE via the satellite, second information on a threshold for a channel quality indicator (CQI) report disabling mechanism,
   wherein whether the CQI report is disabled or not is determined based on a comparison between the threshold and a measured propagation delay between the UE and the satellite, and
   wherein the second TA is determined based on a position of the UE.

4. The method of claim 3, wherein the CQI report is disabled, in case that the measured propagation delay between the UE and the satellite is larger than the threshold.

5. A user equipment (UE) in a non-terrestrial network (NTN), the UE comprising:
   a transceiver; and
   a processor configured to:
      receive, from a base station via a satellite, first information associated with a first timing advance (TA) common for a cell,
      determine a second TA based on a position of the UE,
      perform, based on the first TA and the second TA, uplink transmission to the base station,
      receive, from the base station via the satellite, second information on a threshold for a channel quality indicator (CQI) report disabling mechanism, and
      determine whether the CQI report is disabled or not based on a comparison between the threshold and a measured propagation delay between the UE and the satellite.

6. The UE of claim 5, wherein the CQI report is disabled, in case that the measured propagation delay between the UE and the satellite is larger than the threshold.

7. A base station in a non-terrestrial network (NTN), the base station comprising:
   a transceiver; and
   a processor configured to:
      transmit, to a user equipment (UE) via a satellite, first information associated with a first timing advance (TA) common for a cell,
      perform, based on the first TA and a second TA, uplink reception from the UE, and
      transmit, to the UE via the satellite, second information on a threshold for a channel quality indicator (CQI) report disabling mechanism,
   wherein whether the CQI report is disabled or not is determined based on a comparison between the threshold and a measured propagation delay between the UE and the satellite, and
   wherein the second TA is determined based on a position of the UE.

8. The base station of claim 7, wherein the CQI report is disabled, in case that the measured propagation delay between the UE and the satellite is larger than the threshold.

* * * * *